Patented July 9, 1935

2,007,557

UNITED STATES PATENT OFFICE 2,007,557

PROCESS OF CONTROLLING MOLECULAR AGGREGATION IN THE POLYMERIZATION OF VINYL ESTERS

Kenneth G. Blaikie, George O. Morrison, and Thomas P. G. Shaw, Shawinigan Falls, Quebec, Canada, assignors to Canadian Electro Products Company, Limited, Montreal, Quebec, Canada No Drawing. Application April 30, 1930, Serial No. 448,779

10 Claims. (Cl. 260—2)

This invention relates broadly to improvements in processes for the manufacture of vinyl ester polymerization products, and relates more particularly to methods for controlling the degree of molecular aggregation effected by such processes with the object of enabling products of desired characteristics to be produced with certainty.

It is well known that vinyl esters, such as vinyl acetate, may be polymerized to a certain extent by the action of heat or heat and pressure and also by standing in diffused light or in indirect sunlight. Such processes of polymerization are too slow to be of any commercial importance.

The use of catalysts is necessary in this connection in order to give a sufficient speed of reaction to make the operation of commercial value. The use of benzoyl peroxide has been proposed in this connection. (See U. S. Patent No. 1,241,738.) Furthermore, as disclosed in copending application Ser. No. 447,424, filed April 25, 1930, the use of organic acid anhydrides and certain per bodies, such as hydrogen peroxide and true persalts, are particularly advantageous in this connection.

It is found, however, that the commercial application of vinyl ester polymerization products depends to a great extent upon the degree of polymerization, and while the ordinary vinyl ester polymer, made in the absence of saturated aliphatic aldehyde or in the absence of a solvent, which is of a high degree of molecular aggregation, may have some commercial value, it is in general found that the product of a lower degree of molecular aggregation is of more commercial value. It is, therefore, of importance that conditions for the production of polymerization products should be clearly defined, and capable of control. The inventors have discovered various factors or combinations of factors by the use of which one is enabled to produce a polymerized ester of definite physical properties. The following factors are of the most importance:—

(a) The absence or presence of varying amounts of saturated aliphatic aldehydes. (See U. S. patent application Ser. No. 147,183, filed November 8th, 1926, and U. S. Patent No. 1,725,-362, granted August 20th, 1929.) The use of aldehydes has a most marked effect on the product and it would appear that when using large amounts of aldehyde that a definite chemical reaction takes place.

By the use of aldehyde alone in appropriate concentration, it is possible to obtain polymers of a molecular weight varying all the way from the high molecular weights of poly-vinyl ester polymerized alone to bodies of quite low molecular weights, such as those outlined in U. S. Patent No. 1,725,362, granted August 20th, 1929.

Control by this means is easy where aggregates of low or medium molecular weight are sought but in case of the very high molecular weights a very small change in concentration of aldehyde has a very great effect on the state of polymerization of the product.

(b) The use of organic liquid diluents such as benzol, toluene, alcohols, esters, etc. which are miscible with the vinyl ester and at the same time capable of dissolving the formed polymer. These have a much less marked effect in decreasing the molecular aggregation and the effects of these seem to be merely a matter of dilution.

(c) The presence of pre-formed product. If the polymerization is conducted in presence of a previously formed product, the molecular aggregation of the newly formed product is lower than would otherwise be the case.

(d) The percentage conversion of the ester to the polymer. When a saturated aliphatic aldehyde or an organic liquid diluent is used to decrease the degree of molecular aggregation, the amount of decrease depends to a certain extent on the percentage conversion which takes place. This is apparently a combined effect of dilution by the solvent and dilution by the pre-formed gum.

(e) In addition to the above-mentioned factors, the temperature at which the polymerization reaction is carried out has some effect. This has already been disclosed in the literature. (See Staudinger, Frey and Stark, Beriche 1927, pp. 1782–92.)

(f) A combination of the above factors, the most important of which is a combination of the conditions outlined in (a), (b) and (c). This is of great importance since commercial vinyl esters generally contain traces of aldehydes, the amount of which having been determined by analysis, enables definite determination of how much solvent, such as toluene, must be added in order to give a polymer of definite physical properties. The above applies particularly to the polymerization of vinyl acetate.

The above mentioned factors apply to all methods by which the polymerization reaction is effected, such as by heat or heat and pressure, in the absence or presence of catalysts, by bombing or by heating under a reflux condenser, or by effecting the polymerization by radiation from a mercury vapor lamp or other sources of radiation.

The most characteristic and important physical properties of the polymerization products above mentioned bearing on the general use of the product are its viscosity and its softening point. These not only indicate the molecular aggregation of the product but determine its commercial use.

The viscosity is that determined in an arbitrary concentration in a solvent and by the following method:—

The resin is dissolved in benzene and made up so that at 20° C. one litre contains the simple molecular weight in grammes. This is filtered into the apparatus through cotton-wool, means being taken to avoid loss of solvents. The time of outflow is then determined by the Ostwald viscosimeter, which has been standardized on a pure solvent (benzene), of which the absolute viscosity is known in centipoises.

The softening point is that determined by the following method:—

Molten gum is placed in a glass tube 7 mm. internal diameter so that a plug flush with the end of the tube and extending for a distance of ¼" up the tube is obtained. This is placed in an oil bath. 10 gms. of mercury are poured into the top of the tube. The temperature of the oil bath is then slowly raised until the gum softens sufficiently to allow the mercury to run out. The temperature at which this occurs is called the softening point.

The present invention therefore resides essentially in the polymerization of vinyl esters under predetermined temperature conditions and in presence of a catalyst and one or more bodies capable of influencing the degree of polymerization.

In greater detail the process consists in bringing together a vinyl ester, a suitable catalyst, such as benzoyl peroxide or the reaction product of hydrogen peroxide or a true persalt and an organic acid anhydride, (the choice of catalyst depending to some extent on the intended temperature of treatment) and a saturated aliphatic aldehyde or a diluent, such as toluene, benzol, an alcohol or an ester, or both an aldehyde and a diluent, and maintaining the mixture at predetermined temperature, with or without pressure, until the desired percentage conversion of the ester to polymer is effected.

The temperature varies according to the ester dealt with and the product desired. The choice and proportion of the controlling body or bodies depends on the nature of product desired. Small amounts of aldehydes have a marked effect in producing products of low molecular aggregation with low softening points and low viscosity, while other organic liquids even in relatively large amounts have much less influence. Thus, to produce a product of high molecular aggregation, an organic liquid diluent is preferable to an aldehyde on account of the difficulty of gauging the exact and very small proportion of aldehyde required. Also, in general, when using an aldehyde, the temperautre and percentage conversion must be more carefully regulated to ensure the desired result. On the other hand, to produce a product of lower molecular aggregation, the preferable method is to use a little less than the calculated necessary amount of aldehyde and to supplement the controlling effect by use of an organic liquid diluent. In this way, the degree of molecular aggregation may be very accurately controlled. Another means of control lies in the temperature, lower temperature inducing greater molecular aggregation and vice versa.

As illustrative of the foregoing, Examples I and II show modification by use of a solvent only; Examples III to VII, modification by use of a small amount of aldehyde and varying amounts of solvent, while by comparison, Examples VIII to XIII show similar results without use of aldehyde.

*Example I*

0.6 parts sodium perborate and 1.2 parts acetic anhydride are added to 8 parts toluene and the material allowed to stand with occasional shaking for 24 hours. At the end of this time the toluene solution, which contains the active catalyst, is separated from the insoluble residue by decantation, filtration or other suitable means and the solution added to 92 parts of vinyl acetate, from which substantially all the acetaldehyde usually found in the commercial ester has been removed. The material is now placed in a container under a reflux condenser and maintained at such a temperature that refluxing takes place for a period of two to three hours and the product then distilled to dryness or steam-distilled until the solvent and unchanged vinyl acetate are removed and the product then dried at 100° in vacuo.

Under these conditions and with the above amount (8%) of toluene in the mixture, over 90% of the vinyl acetate is polymerized and the polymer has the following constants as already defined;

Softening point 134° C.; viscosity 15.85 centipoises.

*Example II*

The catalyst is made in the same way as in Example I in 8 parts toluene and the liquid product added to a mixture of 80 parts vinyl acetate free from aldehyde to the extent indicated in Example I and 12 parts toluene. The refluxing and recovery of the product are carried out in the same manner as in Example I. The percentage conversion is about 90% and the physical properties as follows:—

Softening point 101° C.; viscosity 6.32 centipoises.

The following examples will illustrate the combined effects of a small percentage of acetaldehyde in the vinyl acetate and the use of toluene:—

*Example III*

90 parts of commercial vinyl acetate containing .05% acetaldehyde is mixed with 10 parts of toluene and .04 part benzoyl peroxide and heated in an aluminum autoclave to maintain a temperature of approximately 100° C. for 2 hours. It is necessary to cool once the reaction starts, the heating or cooling being regulated by the recorded temperatures. After two hours the pressure is released and the material recovered as in Examples I and II. The softening point is 101.5° C.; and the viscosity 7.38 centipoises.

The following tabulation illustrates in comparison with Example III the variations in viscosity and softening point with variations in the percentage of toluene, the proportion of aldehyde being in all cases the same.

[Parts by weight]

| Example | Toluene | Vinyl acetate | Bz₂O₂ | Per cent conversion | Softening point | Viscosity |
|---------|---------|---------------|-------|---------------------|-----------------|-----------|
| III     | 10      | 90            | .04   | 53.5                | 101.5°C.        | 7.38      |
| IV      | 20      | 80            | .06   | 47                  | 93.7°C.         | 4.53      |
| V       | 30      | 70            | .074  | 53.4                | 87.8            | 3.94      |
| VI      | 35      | 65            | .08   | 50.0                | 84.0            | 3.2       |
| VII     | 40      | 60            | .089  | 47.0                | 80.8            | 2.80      |

The following examples show, by comparison with Examples III to VII, the markedly different results obtained when the vinyl acetate has removed from it substantially all the acetaldehyde usually found in the commercial ester.

[Parts by weight]

| Example | Toluene | Vinyl acetate | Bz₂O₂ | Per cent conversion | Viscosity |
|---------|---------|---------------|-------|---------------------|-----------|
| VIII    | 0       | 100           | .05   | 63.7                | 30.5      |
| IX      | 9.4     | 90.6          | .063  | 66.5                | 9.6       |
| X       | 18.9    | 81.1          | .064  | 73.1                | 6.06      |
| XI      | 28.4    | 71.6          | .070  | 70.8                | 4.24      |
| XII     | 37.6    | 62.4          | .066  | 65.5                | 3.36      |
| XIII    | 48.3    | 51.7          | .075  | 61.2                | 2.65      |

As already mentioned, other organic liquid diluents may be used besides toluene, and in general, any solvents in which the polymerized product is soluble, such as an alcohol, benzol, etc. It is desirable, however, not to utilize any materials which will combine either with the ester or with the aldehyde which may be present, as this will seriously affect the results.

As mentioned in section (d), page —, the average molecular aggregation depends to some extent on the percentage conversion. This is due to the fact that as condensation proceeds the composition of the mixture of diluent and the unreacted vinyl ester changes, since the total amount of diluent remains unchanged and the unconverted vinyl ester decreases. Better control of the degree of molecular aggregation is obtained when the apparatus is arranged in such a way that the percentage of diluent to uncondensed vinyl ester remains substantially constant. This can be carried out in several ways.

(1) In carrying out the reaction under a reflux condenser, a portion only of the condensate is returned and a mixture richer in vinyl ester than that refluxed is fed into the reaction kettle.

(2) By placing a fractionating column above the reaction vessel, and by this means all the vinyl ester may be returned to the kettle and only a suitable part of the diluent.

The following example illustrates the latter method of control:—

*Example XIV*

A composition as indicated in Example I is placed in a suitable container and, when refluxing starts, the vapours evolved are passed into the middle of a refluxing column, with the result that the vinyl acetate is vaporized and is removed through a condenser above the column and is returned to the reaction mixture. From the base of the column, the correct amount of toluene is returned to the reaction vessel to maintain approximately the correct percentage of toluene and unpolymerized vinyl acetate in the reaction kettle.

By this means a polymerized body is obtained which is more constant in composition than by other means and comes nearer to possessing a true melting point than those outlined in the other examples. In general, these have not a true melting point, since they are undoubtedly mixtures of different aggregations of the vinyl acetate molecule.

The continuous process has a softening effect because all the material condenses from a dilute solution of ester in solvent and in pre-formed product, the solution being of constant dilution. In a batch process, the material condenses from highly concentrated ester. This is evident from comparison of batch and continuous treatments of similar mixtures, for instance, mixtures of toluene 30%, vinyl acetate 70% and a catalyst, prepared from sodium perborate and acetic anhydride, equivalent to 0.4% of perborate based on the vinyl acetate.

*Example XV*

In the batch process, the mixture as above is placed in the kettle under a reflux condenser and heated with agitation so that refluxing continues for two hours and forty minutes. The product when steam distilled and dried shows 93% conversion and the product has a viscosity of 3.53 centipoises and a softening point of 85.5° C.

*Example XVI*

In the continuous process, the mixture as above is run at constant rate into the kettle still containing the undistilled product of Example XV and provision is made for constant level overflow. As the constant feed is continued, the viscosity of the product gradually drops to a final constant figure of 2.54 centipoises. When this state of equilibrium is reached, the feed and draw off are continued with heating sufficient to give a moderately slow refluxing. At the end of twenty hours, the product is treated as before and is found to have a viscosity of 2.54 centipoises and softening point of 79.8° C. The percentage conversion on the vinyl acetate fed is 77.9%.

*Example XVII*

0.6 parts of sodium perborate and 1.2 parts of acetic anhydride are mixed with about 8 parts of commercial butyl acetate (containing about 10% butyl alcohol). After shaking for a period of time the clear liquid is separated from the insoluble residue and mixed with 60 parts vinyl acetate (substantially free from acetaldehyde), and 32 parts commercial butyl acetate. Part of this mixture is then heated under reflux with agitation in a vessel fitted with a side tube through which the material can be withdrawn, raised to about 92–94° C. and then held there by running in the remainder of the vinyl acetate-butyl acetate-catalyst mixture. At the same time the polymerized vinyl acetate is continuously withdrawn at the same rate as the fresh mixture is added. Operating under these conditions a polymerized vinyl acetate can be obtained which has a softening point of 99° C. and a viscosity of 5.6 centipoises.

Similar results may be obtained using other solvents, for instance, ethyl or butyl alcohol or ethyl acetate.

The degree of polymerization of other vinyl esters, for instance, vinyl formate, vinyl butyrate and vinyl propionate, is influenced in the manner herein described and results are obtained similar to those shown in the various examples but differing in the actual figures for different esters.

A somewhat higher degree of polymerization is obtained by substituting for the toluene solvent an equal amount of butyl acetate-butyl alcohol mixture.

Having thus described our invention, what we claim is:—

1. A process of controlling molecular aggregation in the polymerization of vinyl esters, which comprises subjecting a vinyl ester to conditions causing polymerization while in presence of a diluent, and withdrawing the diluent in amount increasing as the amount of unpolymerized ester decreases thereby to maintain substantially constant proportions of the two.

2. A process of polymerizing vinyl esters, which comprises subjecting a vinyl ester to conditions causing polymerization while in presence of a saturated aliphatic aldehyde and a diluent which is a solvent for the formed polymer, and removing the diluent as the polymerization proceeds and at such rate as to maintain the proportions of unpolymerized ester and diluent substantially constant.

3. A process of polymerizing vinyl esters to produce products of predetermined characteristics, which comprises subjecting a vinyl ester to conditions causing polymerization while in presence of a saturated aliphatic aldehyde and an organic liquid diluent capable of holding in solution the polymer formed therein, the aldehyde being present in amount less than necessary to produce a product of the predetermined characteristics and the diluent being present in amount sufficient to supplement the action of the aldehyde to the extent necessary to produce a product of the predetermined characteristics, and maintaining the proportion of unpolymerized ester to said diluent substantially constant.

4. A process according to claim 3, in which the aldehyde is acetaldehyde.

5. A process according to claim 3, in which the diluent is toluene.

6. A process of controlling molecular aggregation in the polymerization of vinyl esters which comprises determining the aldehyde content of a vinyl ester, adjusting the aldehyde content of the ester to somewhat less than the calculated amount required to restrict the molecular aggregation to the desired extent, and heating the vinyl ester and aldehyde in presence of a polymerization catalyst and a calculated amount of a diluent which is also a solvent for the formed polymer and maintaining the relative proportions of diluent and unpolymerized ester substantially constant.

7. A process of controlling molecular aggregation in the polymerization of vinyl esters, which comprises determining the aldehyde content of a vinyl ester, adjusting the aldehyde content of the ester to somewhat less than the calculated amount required to restrict the molecular aggregation to the desired extent, and heating the vinyl ester and aldehyde in presence of a polymerization catalyst and a calculated amount of a diluent which is also a solvent for the formed polymer and maintaining the relative proportions of unpolymerized and polymerized ester substantially constant.

8. A process of controlling molecular aggregation in the polymerization of vinyl esters which comprises determining the aldehyde content of a vinyl ester, adjusting the aldehyde content of the ester to somewhat less than the calculated amount required to restrict the molecular aggregation to the desired extent, and heating the vinyl ester and aldehyde in presence of a polymerization catalyst and a calculated amount of a diluent which is also a solvent for the formed polymer, adding ester, aldehyde, diluent and catalyst in the original proportions and withdrawing the reaction mixture including the formed polymer at a rate substantially equal to the rate of addition aforesaid.

9. A process of controlling molecular aggregation in the polymerization of vinyl esters which comprises determining the aldehyde content of a vinyl ester, adjusting the aldehyde content of the ester to somewhat less than the calculated amount required to restrict the molecular aggregation to the desired extent, and heating the vinyl ester and aldehyde in presence of a polymerization catalyst and a calculated amount of a diluent which is also a solvent for the formed polymer and maintaining the relative proportions of diluent and unpolymerized ester substantially constant, by withdrawing polymerized and unpolymerized ester and diluent and adding ester, aldehyde, and diluent at substantially the rate of withdrawal.

10. A process of controlling molecular aggregation in the polymerization of vinyl esters which comprises determining the aldehyde content of a vinyl ester, adjusting the aldehyde content of the ester to somewhat less than the calculated amount required to restrict the molecular aggregation to the desired extent, and heating the vinyl ester and aldehyde in presence of a polymerization catalyst and a calculated amount of a diluent which is also a solvent for the formed polymer, and maintaining the relative proportions of diluent and unpolymerized ester substantially constant by conducting the reaction under refluxing conditions and withdrawing the diluent at substantially the rate of polymerization.

KENNETH G. BLAIKIE.
GEORGE O. MORRISON.
THOMAS P. G. SHAW.